United States Patent

McKissick et al.

[15] 3,675,201

[45] July 4, 1972

[54] THRESHOLD VOLTAGE DETERMINATION SYSTEM

[72] Inventors: John A. McKissick, Madison Heights; Arvin D. McGregor, Birmingham, both of Mich.

[73] Assignee: Burroughs Corporation, Detroit, Mich.

[22] Filed: Feb. 24, 1970

[21] Appl. No.: 13,490

[52] U.S. Cl. ........................340/146.3 AG, 178/7.1, 178/7.6

[51] Int. Cl. ........................G06k 9/00

[58] Field of Search ...............340/146.3, 146.3 AG; 178/7.1, 178/7.6

[56] References Cited

UNITED STATES PATENTS

| | | | |
|---|---|---|---|
| 3,159,815 | 12/1964 | Groce | 340/146.3 |
| 3,484,747 | 12/1969 | Nunley | 340/146.3 |
| 3,432,032 | 3/1969 | Curphey et al | 340/146.3 X |
| 3,415,950 | 12/1968 | Bartz et al | 340/146.3 X |

OTHER PUBLICATIONS

Villante, IBM Tech. Disclosure Bulletin, " Automatic Threshold Control Circuit," Nov. 1962, Vol. 5, No. 6, pp. 55 & 56.

*Primary Examiner*—Maynard R. Wilbur
*Assistant Examiner*—Leo H. Boudreau
*Attorney*—Kenneth L. Miller and Edwin W. Uren

[57] ABSTRACT

In a character recognition system, a threshold voltage determination system for providing a decision making voltage level separating "black" data signals from "white" data signals. A plurality of scanning amplifiers are individually coupled in an electrical parallel circuit to a voltage divider which responds to variations in the "black" data signals. The threshold voltage determination system generates a voltage level which is intermediate the voltage magnitude of the "black" data signal and the "white" data signal. A minimum threshold voltage level is also provided to maintain a predetermined minimum decision making voltage level in the absence of character being read.

2 Claims, 8 Drawing Figures

PATENTED JUL 4 1972

3,675,201

INVENTORS
JOHN A. McKISSICK
ARVIN D. McGREGOR
BY
Russel C. Wells
ATTORNEY

THRESHOLD VOLTAGE DETERMINATION SYSTEM

SUMMARY OF INVENTION

In character recognition systems, be they either optical or magnetic character reading systems, it is necessary to decide between bonafide characters and extraneous ink or non-characters on several different document color backgrounds. Therefore, it is necessary to provide a scanning means which is divided into a plurality of parallel spaced apart scanning members defining data channels wherein each member scans a predetermined portion or track of a character. Coupled to each scanning member is a transducing means to convert the signal generated by the scanning member in response to a character into an electrical signal. The electrical signal is then amplified for utilization by a comparator circuit. Also, the amplified signal from each transducer is coupled by a unidirectional voltage coupling means to a single common node in a voltage divider means. The output of the voltage divider means is responsive to the largest voltage magnitude of the electrical signals from the transducer means and generates a threshold voltage level having a predetermined ratio between the largest voltage magnitude and a reference voltage. This threshold voltage level is compared against the output of each amplified transducer signal in a comparator to generate a binary value signal representing "black" or "white."

There is also provided a separate predetermined minimum threshold voltage source which is coupled by means of a unidirectional voltage coupling means to the same common node in the voltage divider means as are the amplified transducer voltage signals. This source maintains the output of the voltage divider means at a minimum level for determining the validity of extraneous ink on the background between characters.

DETAILED DESCRIPTION

Figure 4:
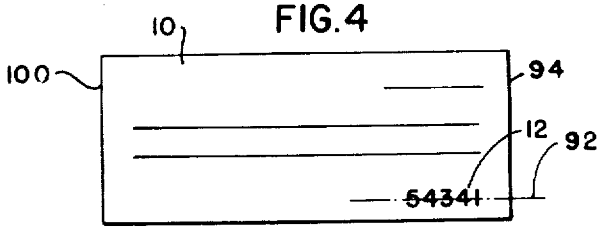
FIG. 4 is a representation of a document which is moved relative to the scanner in FIG. 2.
Figure 1:
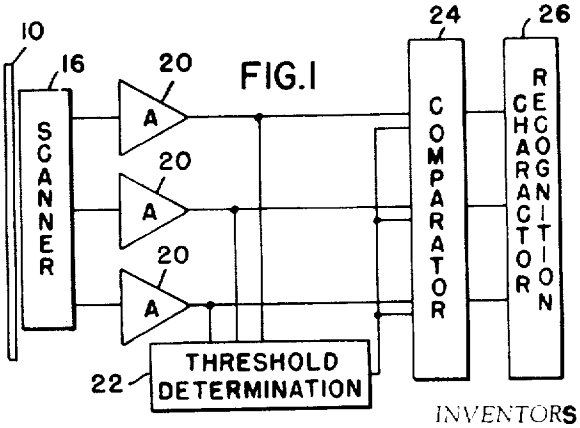
FIG. 1 is a block diagram representation of the threshold voltage determination system according to the preferred embodiment.

Referring to Figures by the characters of reference there is shown in FIG. 1 a diagrammatic representation of the voltage threshold determination system which may be used in a character recognition system. A document 10 which may be a check such as shown in FIG. 4 having positioned thereon a plurality characters 12, is driven by a plurality of drive wheels 14 in front of a scanner 16. The drive wheels 14 as shown schematically in FIG. 2 have associated therewith an idler roller 18 which cooperates to drive the check or document 10 across the scanner 16. Operatively connected to the scanner 16 is a transducer-amplifier 20 which is responsive to the output of the scanner to generate an electrical signal. In FIG. 1 there is schematically represented three transducer-amplifiers, however, in the preferred embodiment there are 22 such amplifiers.

Operatively coupled to the output of each transducer-amplifier 20 is a threshold determination circuit 22 which provides a decision voltage proportional to the signal output of the transducer-amplifier. This decision voltage is applied to a comparator circuit 24 wherein the output from each transducer-amplifier 20 is compared with the decision voltage. As a result of this comparison, a binary voltage signal is generated from the comparator and is supplied to the character recognition circuit 26. The comparator generates an output for each and every transducer-amplifier. The character recognition circuit functions to assemble all of the comparator signals for decoding into an electrical signal representative of a character on the document 10.

Figure 2:
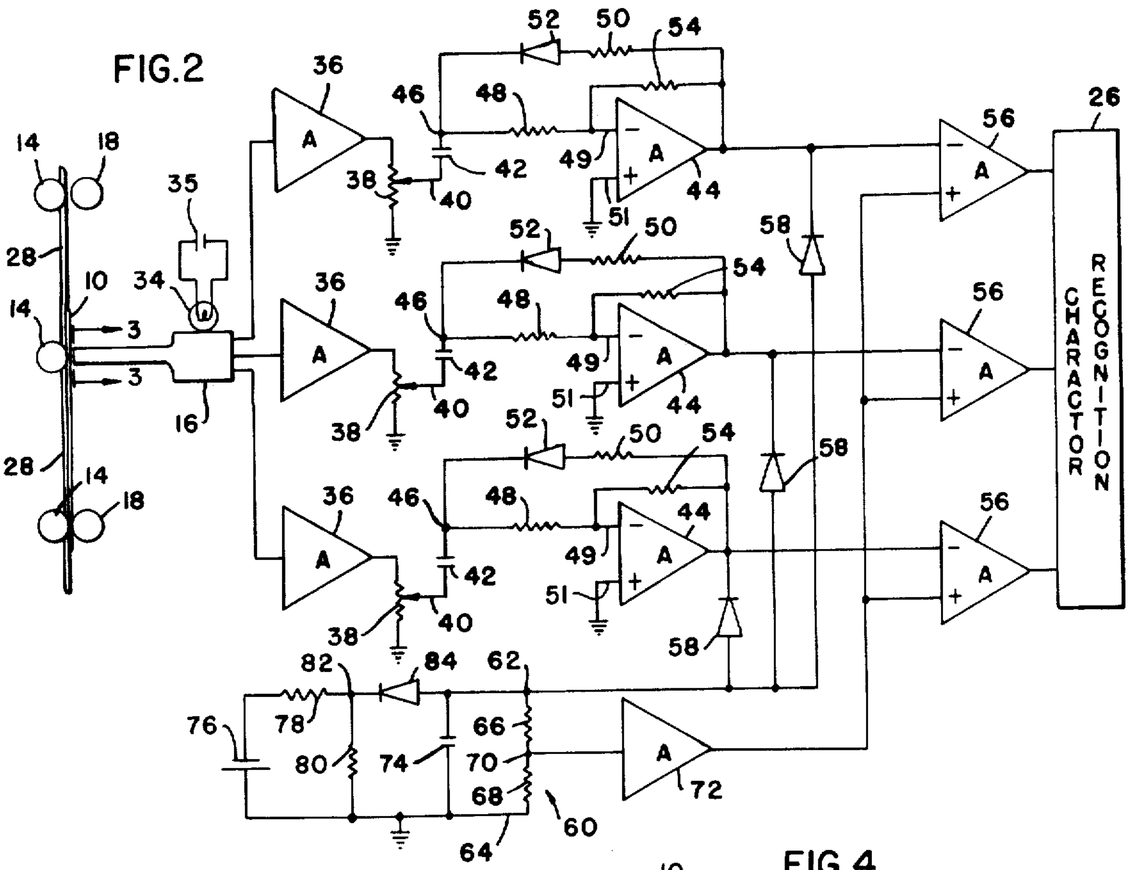
FIG. 2 is a schematic representation of the system of FIG. 1.

As previously stated, the document 10 which is shown in FIG. 4 may take the form of a check such as used in the financial industry. The characters 12 printed on the check may represent several different items of data such as the amount of the check, account number, bank number, etc. The characters are generally printed in a contrasting color from that of the background color of the document 10. In the preferred embodiment the printing of the characters is by black ink. The background of the check is generally a much lighter color. As shown in FIG. 2, the document 10 is driven along the path defined by the drive rollers 14 and their associated idler rollers 18 and several wall plates 28. The documents 10 are driven singly on end at a speed of approximately 300 inches per second when they are passing the front of the scanner 16. Since FIG. 2 is a schematic representation only, the means for driving the rollers 14 which may be an electrical motor interconnected to each drive roller by a plurality of drive belts, is not shown. Also for reasons for clarity, the opposite wall defining the document travel path has been omitted.

The scanner 16 may be any well-known magnetic or optical scanner such as may be found in a character recognition system. An example of an magnetic scanner may be a multichannel magnetic recording head such as disclosed in application Ser. No. 833,909 entitled Multiple Transducer Magnetic Head which is assigned to the same assignee as this application. However, in the preferred embodiment the scanner 16 is an optical scanner comprised of a plurality of data scanning channels 30 surrounded by a plurality of light transmitting channels 32. Each channel in the scanner 16 comprises a light conducting material such as an optical fiber. The data scanning channels 30 are a plurality of position-oriented fibers. These fibers are oriented in a line which is orthogonal to the travel of the document 10. The light transmitting channels 32 comprise a plurality of fibers which are not arranged in any particular manner but are positioned on either side of the data scanning channels 30.

Figure 3:
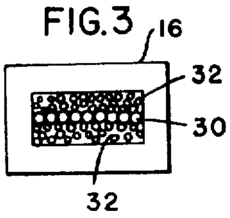
FIG. 3 is a view of the scanner taken along line 3—3 of FIG. 2.

The light transmitting channels 32 are so positioned that one end thereof is adjacent to the lamp 34 and function to transmit the intensity of the lamp 34 to the surface of the document 10. The lamp 34 may be illuminated by any well known power source such as the battery 35. The light so transmitted is reflected off the surface of the document 10 to the data scanning channels 30. The light which is being transmitted by the data scanning channels 30 is a data-bearing light signal as will hereinafter be shown. In the preferred embodiment, the data scanning channels 30 are aligned adjacent to one another as shown in FIG. 3 and extend a length which is substantially greater than the height of the characters 12 being scanned. The cross-sectional diameter of each of the data scanning channels 30 is much larger than the diameter of the light transmitting channels 32, however, this need not be a requirement. Since the only function of the light transmitting channel 32 is to transmit light intensity from the lamp 34 to the surface of the document 10, it is not required that these channels be aligned in any particular order. Conversely, the data scanning channels 30 must be aligned in a particular order so that the information transmitted thereby is correctly received by the character recognition system 26.

As previously mentioned the output of the scanner 16 is coupled to a transducer-amplifier 20. Each data scanning channel 30 has associated therewith an individual transducer-amplifier circuit. Therefore, in the preferred embodiment there are 22 transducer-amplifier circuits. In FIG. 2 there is shown a schematic representation of three such transducer-amplifier circuits. Directly connected to the output of the scanner 16 and in particular to each data scanning channel 30 is a transducer 36 which in the preferred embodiment is a phototransistor. The phototransistor is a N-P-N device operating, as a class A amplifier having a positive voltage output of approximately 2 to 3 volts when there is no document in front of the scanner 16. The function of the transducer is to convert the light energy transmitted by the data scanning channel 30 into an electrical signal.

As illustrated in FIG. 2, the electrical signal output of the transducer 36 is developed across a potentiometer 38 which is connected at one end to ground and at the other end to the output of the transducer. The function of the potentiometer 38 is to provide compensation for each channel. This compensation is necessary to adjust for differences in the individual phototransistors and also the differences which may be present in the data scanning channels 30. By suitable adjustment of the potentiometer 38, the output of each transducer 36, under a given uniform condition, is made equal.

Figures 5, 6, 7, 8:
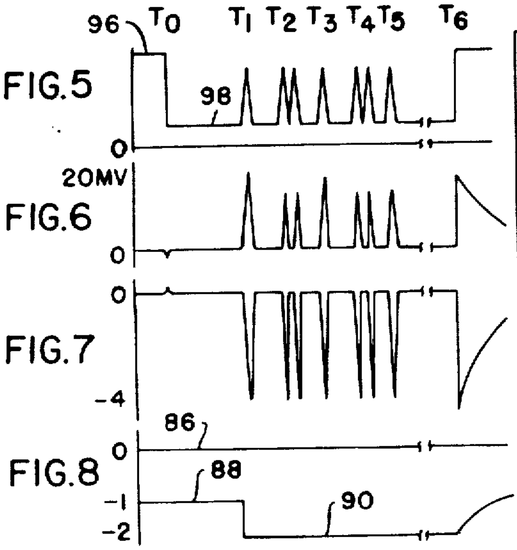
FIG. 5 through 8 are voltage waveforms taken at various points in FIG. 2.

Directly connected to the wiper arm 40 of each potentiometer 38 is a capacitor 42. The function of the capacitor is to a.c. couple the output signal of the transducer 36 to the amplifier 44, thereby removing the d.c. level from the signal output of each of the data scanning channels 30. FIG. 5 is a representation of the signal which may be found at the connection of the capacitor 42 and the potentiometer wiper arm 40. FIG. 6 is the same signal shown at the other end of the capacitor at the junction point 46.

The amplifier 44 is a differential amplifier and the signal at point 46 is directly connected through the resistor 48 to the negative input 49 of the amplifier. The positive input 51 of the amplifier is connected to ground thereby the output of the amplifier will be a negative signal having ground potential as its most positive voltage.

The output of the amplifier 44 is coupled to the point 46 by a feedback network comprising a resistor 50 and a diode 52. When the voltage output of the amplifier attempts to become positive, the diode 52 conducts to "feedback" this positive voltage to the negative input 49 of the amplifier and thereby returns the output to ground. The amplifier 44, being a differential amplifier, generates a negative voltage output when the signal on the "negative" input 49 becomes more positive than the signal on the positive input 51. As illustrated in FIG. 2, the positive input 51 is electrically coupled to ground. Therefore, the function of the feedback network is to clamp point 46 to ground potential between characters thereby preventing the voltage output of the amplifier 44 from exceeding ground potential.

The voltage waveform of FIG. 7 is the waveform at the output of the amplifier 44 and illustrates that the output signal from the amplifier is a negative-going signal from a base line of ground potential. A second parallel feedback path from the output of the amplifier to the negative input of the amplifier comprises a resistor 54 which is typically used in differential amplifiers which are fabricated from the well-known operational amplifier.

The output of the amplifier 44 is connected to a comparator circuit 24 which comprises a plurality of differential amplifiers 56. In particular, the output of the amplifier 44 is electrically connected to the negative input of the amplifier 56 and the positive input of the amplifier 56 is electrically connected to the threshold voltage determination circuit as will hereinafter be explained. As shown in FIG. 2 there is one differential amplifier 56 for each data scanning channel 30 of the scanner 16. The output of the differential amplifier 56 is a binary voltage signal wherein the binary one signal which in the preferred embodiment is a positive voltage, indicates the presence of a "black" portion of a character in front of the scanner 16 and the binary zero signal which is ground in the preferred embodiment, indicates the presence of the background of the document in front of the scanner 16. The signal output of the amplifier 56 is electrically connected to the character recognition circuit 26.

A character recognition circuit 26 comprises several stages of logic decision-making circuitry wherein the first stage is basically a matrix. The number of rows in the matrix correspond to the number of data scanning channels 30 of the scanner 16 and the number of columns of the matrix corresponds to the number of the interrogations made of each character passing the scanner 16. In the preferred embodiment the width of each character is 0.070 inches and each character is interrogated every 0.010 inches, therefore the number of columns in the matrix is seven. The binary voltage output signal from the comparator is entered into the first column of the matrix and at predetermined intervals, namely, every interrogation time the information in each column is shifted to the right. Hence, the information in column one is shifted to column two and so forth. After seven interrogations, the information concerning the character just previously scanned is completely placed within the matrix and at this point in time several logical circuits within the character recognition system 26 perform the function of recognizing the character.

In order to accomplish the purposes of a character recognition system, it is necessary to convey the characters 12 as printed on the document 10 by suitable means to the character recognition system 26. As hereinbefore described, an optical signal which is representative of the portion of a character immediately adjacent to the scanner 16 is transformed into an electrical signal for application to the character recognition system 26. In order to accurately make a determination of the character of the electrical signal, the voltage threshold determination circuit 22 of the present invention is provided. This voltage threshold determination circuit 22 is responsive to the amplified electrical signal output of the scanner 16 and provides a decision voltage for each stage of the comparator 24.

To accomplish the above objective, the output of each amplifier 44 is connected by an unidirectional voltage coupling means or diode 58 to one end 62 of a voltage divider network 60. The other end 64 of the voltage divider network 60 is connected to a reference voltage representing the background of the document which in the preferred embodiment is ground. In the preferred system the operating voltages are negative, therefore, the cathode lead of the diode 58 is connected to the output of the amplifier and the anode lead of each diode 58 is connected to a single common node 62 at the one end of the voltage divider 60. Since there are a plurality of data scanning channels, the configuration of the diodes 58 may be classified as an "OR" logical circuit.

The voltage divider network comprises two serially connected resistors 66 and 68 which are electrically connected together at point 70. In the preferred embodiment, the resistors are equal in value, therefore, the voltage at point 70 is equal to one half the voltage at point 62. The value of ratio between the threshold voltage and the "black" voltage is a function of value of these two resistors. The voltage at point 70 is connected by a power amplifier 72 to the positive inputs of each of the comparator amplifiers 56. The voltage gain of the amplifier 72 is one, however, the power gain is much greater.

Connected in electrical parallel circuit with the voltage divider network 60 is a capacitor 74. The capacitor charges to the negative voltage at point 62 which is derived from the negative voltage output of the amplifiers 44 or the potential at point 82 as will hereinafter be described. The capacitor 74 is discharged by the voltage divider network 60 to the reference voltage. The charge time constant of the capacitor 74 is extremely fast on the order of the time it takes to interrogate one point of the character or approximately 33 microseconds in the preferred embodiment. The discharge time constant of the capacitor 74 is extremely long on the order of the time it would take to scan three or four of the characters 12 on the document 10. In the preferred embodiment, this is approximately 600 to 900 microseconds as will be hereinafter shown. With such arrangement, once a series of characters 12 on the document 10 is being scanned, the capacitor 74 rapidly charges to the most negative voltage output of the amplifiers 44 and when the series of characters has ended, the voltage at point 62 slowly returns toward the normal output voltage level of the amplifiers 44 as the capacitor 74 discharges.

In order to prevent error signals from being generated by the comparator circuits 56 when there are no characters being scanned by the scanner 16, a minimum voltage threshold is applied to the voltage threshold determination circuit. This voltage is generated by means of a voltage source such as the battery 76 and a pair of series connected resistors 78 and 80 connected across the battery. The interconnecting point 82 of the two resistors is then coupled to the point 62 by a unidirectional voltage coupling means such as the diode 84. In the preferred embodiment which is illustrated with negative voltages, the diode 84 is connected so that its cathode lead is connected to point 82 and its anode lead is connected to point 62. With such a connection, the voltage at point 62 will remain a negative value which is the function of the voltage drops across the resistors 78 and 80 and the value of the voltage source 76.

The operation of the threshold voltage determination system 22 is illustrated by the waveshape of FIG. 8 which is the potential at point 70 of the voltage divider network 60. In FIG. 8 the upper level 86 is the reference potential and the voltage represented by line 88 is the minimum threshold voltage. The voltage represented by line 90 is the decision level voltage generated by the voltage divider network in a manner hereinbefore explained.

OPERATION

To best understand the circuit of FIG. 2, reference is made to the document 10 of FIG. 4 and the characters 12 encoded thereon. As previously stated, the document 10 moves 300 inches per second across the front of the scanner 16. Since each character is 0.070 inches wide, it is scanned by the scanner 16 in approximately 230 microseconds. Thus, each interrogation occurs approximately every 33 microseconds. The voltage waveshapes shown in FIGS. 5 through 8 represent the signal of one of the data scanning channels 30 scanning along 92 in FIG. 4.

As illustrated in FIG. 2 immediately in front of the scanner 16 is a drive roller 14. In the preferred embodiment such a drive roller is dark or black in color, and the output of the transducer 36 is 2–3 volts. At $T_0$ the leading edge 94 of the document 10 is front of the data scanning channels 30 and the voltage output of the transducer 36 goes from the level 96 to some voltage level 98. This is illustrated in FIG. 5 which is the voltage on the wiper arm 40 of the potentiometer 38. The voltage level 98 represents the background color of the document 10.

The voltage pulses shown in FIG. 5 occurring at times $T_1$, $T_2$, $T_3$, $T_4$, and $T_5$ represent the characters 12 on the document 10 as they are being scanned by the scanner 16. As illustrated in FIG. 4 the data scanning channel 30 which is moved relative to the document 10 along the scanning line 92 from right to left will intersect the first, third and fifth characters at only one position, and will intersect the second and fourth characters at two positions each. This is a function of the character only.

As the trailing edge 100 of the document 10 passes the scanner 16, the voltage output of the transducer returns to the level 96 at $T_6$.

The voltage waveform shown in FIG. 6 is basically the same waveform as that shown at FIG. 5 with the d.c. reference level removed. This, of course, is the voltage at point 46. At $T_6$ there is shown the long discharge of the capacitor 42 as a result of the trailing edge 100 of the document 10 being driven past the scanner 16. The magnitude of the voltage peaks in FIG. 6 is approximately 20 millivolts in the preferred embodiment.

The output of the amplifier 44 is shown in the FIG. 7. Note that in both FIG. 6 and FIG. 7 the signal generated by the leading edge 94 of the document 10 is substantially removed from the circuit due to the feedback resistor 50 and series connected diode 52. The output of the amplifier as shown in FIG. 7 is a plurality of negative going signals reaching a negative limit of approximately 4 volts.

As previously mentioned, the voltage waveshape of FIG. 8 is representative of the voltage output of the threshold voltage determination circuit. In the preferred embodiment, the voltage source 76 and the two resistors 78 and 80 function to provide a minimum threshold voltage of approximately minus one volt which is represented by the level 88 in FIG. 8. In the preferred embodiment, at $T_1$ the level drops to approximately minus two which is one-half the magnitude of the voltage pulses in FIG. 7 because the two resistors 66 and 68 of the voltage divider network 60 are equal. As previously mentioned, the capacitor 74 rapidly charges to the output of the amplifier 44, hence the abrupt shifting of voltage levels from 88 to 90. However, since the discharge path of the capacitor 74 is through the voltage divider network 60 which as previously mentioned forms an extremely long time constant, the voltage level 90 remains substantially at minus two until $T_6$. At $T_6$ the trailing edge of the document passes the scanner and the capacitor 74 discharges to substantially the value of the voltage at point 82.

The voltage values used herein are representative of those given a document 10 and are used for the purposes of illustration only. A document having a much lighter or more reflective background would reflect more of the light from the lamp 34 and the output of the amplifier 44 will be much greater or more negative than the −4 volts illustrated. If this is so, then the decision voltage from the threshold voltage determination system as illustrated by the level 90 of FIG. 8 would correspondingly be more negative than −2. Conversely, if the background of the document 10 was darker and did not reflect much of the light of the source 34, the magnitude of the decision voltage would be smaller.

If the scanner 16 detected a smudge which is defined as a light grey area along the row of characters, the magnitude of the voltage output of the data scanning channel detecting the smudge would be much smaller than that of a data scanning channel associated with a character. Therefore, the voltage generated by the threshold determination system which is a function of the characters, would, when applied to the comparator for "smudge" data scanning channel, generate a binary zero voltage signal out of the comparator.

There has been shown a threshold voltage determination system such as may be used in a character recognition system which functions dynamically about the output of the several channels of the multichannel scanner 16. Since the characters being scanned are much shorter in height than the overall height scanned by the plurality of data scanning channels 30, the background of each document forms a reference voltage level for the transducer output of each channel. The threshold voltage determination system provides an output voltage which is proportional to the magnitude to the voltage generated by each character as it moves relative to the scanner 16. Thus, for each document 10 which passes the scanner, the threshold or decision voltage from the threshold voltage determination system is accordingly adjusted to a level which is proportional to the "character" voltage and the "-background" voltage of the document 10.

We claim:

1. In a multi-channel character recognition system, a threshold voltage determination system comprising:

scanning means having a plurality of individually and parallelly arranged scanning members each member scanning a predetermined channel of a preselected portion of indicia on a document as said document moves relative to said scanning means, a plurality of transducing means operatively coupled respectively to each of said scanning members for generating an electrical signal in response to the predetermined channel of the portion of indicia scanned thereby, said electrical signal having a voltage range between a first voltage characterizing the document background and an extreme voltage characterizing the indicia, a plurality of diodes electrically connected at one end to each of said plurality of transducing means and collectively electrically connected together at the other end, the voltage at said collectively connected end being equal to the extreme voltage level generated by said plurality of transducing means for providing an extreme voltage level characterizing the indicia, voltage divider means electrically connected at one end to a reference voltage level characterizing a minimum threshold voltage level and at the other end to said collectively connected end of said diodes, said divider means providing a threshold voltage level intermediate the reference voltage level and the extreme voltage level as generated by said plurality of transducer means, and capacitive means electrically connected at one end to said collectively connected end of said diodes and at said other end to said reference voltage, said capacitive means being of a fast charge time constant to immediately charge to said threshold voltage level provided by said divider means in response to the extreme voltage level generated by said plurality of transducer means and being of a slow discharge time constant to maintain said threshold voltage level for a predetermined time in the absence of continuous indicia in said preselected portion of indicia.

2. In a multi-channel optical character recognition system, a threshold voltage determination system comprising:

a document having a plurality of light absorptive characters printed thereof, said characters aligned in a spaced apart pattern longitudinally positioned on said document, means for singly transporting said document along a predetermined path of travel, a source of radiant energy adjacent to the path of travel, radiant energy transmitting means positioned substantially orthogonal to said document and operable for transmitting the radiant energy from said source to the characters on said document, data scanning means for each channel responsive to the reflected radiant energy from said document and from the characters printed thereon, a transducer operatively coupled to each of said data scanning means for generating a first electrical signal in response to the radiant energy reflected from said document and for generating a second electrical signal in response to the radiant energy reflected from the characters on said document, a differential amplifier for each channel operatively coupled respectively to each of said transducers at one input thereof and each electrically connected at the other input thereof to a reference voltage signal representing the amount of reflected energy from a standard document background, said amplifiers responsive to said first and second electrical signal for generating a third electrical signal representing the voltage magnitude between either said first or second electrical signal applied to said one input and the reference voltage signal applied to said other input, a plurality of diodes electrically connected at one end to the output of each of said differential amplifiers respectively and electrically connected at the other end to a common terminal, said diodes forming a logical OR gate for coupling the magnitude of the largest third signal to said common terminal for maintaining the voltage at said common terminal substantially equal to said largest voltage magnitude, a voltage divider electrically connected between said common terminal and said reference voltage for generating at its output a threshold voltage signal proportional to the difference between said reference voltage and the largest third signal voltage magnitude, an R-C circuit electrically connected in parallel to said voltage divider and having a fast charge time constant to immediately charge to said threshold voltage signal and a slow discharge time constant to maintain said threshold voltage signal for a predetermined period of time during interruptions in the character printed in said spaced apart pattern on said document, and comparator means for each channel operatively connected respectively at one input thereof for receiving said third electrical signal from said differential amplifier and electrically and commonly connected at another input thereof to said output of said voltage divider for generating a binary one voltage signal when the magnitude of said third electrical signal is greater than the magnitude of said threshold voltage signal and for generating a binary zero signal when the magnitude of said third electrical signal is less than the magnitude of said threshold voltage signal.

* * * * *